United States Patent
Moffitt et al.

(10) Patent No.: US 6,900,818 B1
(45) Date of Patent: May 31, 2005

(54) PRIMITIVE CULLING APPARATUS AND METHOD

(75) Inventors: Stephen Moffitt, Menlo Park, CA (US); Eng Lim Goh, Singapore (SG)

(73) Assignee: Silicon Graphics, Inc., Mountain View, CA (US)

(*) Notice: Subject to any disclaimer, the term of this patent is extended or adjusted under 35 U.S.C. 154(b) by 0 days.

(21) Appl. No.: 10/716,186

(22) Filed: Nov. 18, 2003

(51) Int. Cl.$^7$ ................................................. G09G 5/00
(52) U.S. Cl. ........................ 345/622; 345/620; 345/421
(58) Field of Search ................................ 345/419, 420, 345/421, 422, 582, 620, 621, 622

(56) References Cited

U.S. PATENT DOCUMENTS

| | | | |
|---|---|---|---|
| 5,986,669 A | 11/1999 | Kirkland | 345/620 |
| 6,636,215 B1 * | 10/2003 | Greene | 345/422 |
| 2002/0196251 A1 * | 12/2002 | Duluk et al. | 345/420 |
| 2004/0196281 A1 * | 10/2004 | Huang | 345/419 |

* cited by examiner

Primary Examiner—Matthew Luu
(74) Attorney, Agent, or Firm—Bromberg & Sunstein LLP (57) ABSTRACT

A method and apparatus for processing a primitive for potential display on a display device (having a plurality of pixels) determines if the primitive intersects at least a predetermined number of pixel fragments on the display device. The predetermined number is no less than one. The method and apparatus then cull the primitive as a function of whether the primitive intersects at least the predetermined number of pixel fragments. If it is culled, the primitive is not raster processed (i.e., not subjected to raster processing, whether or not complete).

20 Claims, 5 Drawing Sheets

PRIMITIVE CULLING APPARATUS AND METHOD

RELATED APPLICATIONS

This patent application is related to United States patent application Ser. No. 10/715,882 filed on even date, entitled, "METHOD AND APPARATUS FOR PROCESSING PRIMITIVE DATA FOR POTENTIAL DISPLAY ON A DISPLAY DEVICE," and naming Stephen Moffitt and Eng Lim Goh as inventors, the disclosure of which is incorporated herein, in its entirety, by reference.

FIELD OF THE INVENTION

The invention generally relates to graphics processing and, more particularly, the invention relates to processing graphics primitives for potential display on a display device.

BACKGROUND OF THE INVENTION

Many computer systems have a specialized graphics subsystem for producing vivid graphical images. At the core of these subsystems typically is a graphics processor that processes graphics data in a highly streamlined manner. In simplified terms, the graphics processor converts substantially unprocessed graphics data into a format that can be displayed on a conventional display device (e.g., a cathode ray tube display or a liquid crystal display).

Undesirably, graphics subsystems often process large amounts of graphical data for portions of objects that are not going to be displayed. For example, 3D graphics subsystems implementing OPENGL typically produce graphical data (e.g., attribute data, such as normal and texture data) for most primitives in an image—even for those primitives that are too small to light any pixels on the display device. Graphics processors in those subsystems nevertheless typically at least begin rasterizing such primitives before determining that they are too small to render.

Making that determination that late in the rendering process (i.e., during rasterization) can create processing inefficiencies. For example, before determining that the primitive is too small, the graphics processor may have performed geometry processes, calculated gradient information, and determined color information for the portion of the primitive between the vertices. Of course, calculating all that data is unnecessary if the primitive is too small to render. As a result, processing time is longer than necessary, consequently inhibiting system performance.

SUMMARY OF THE INVENTION

In accordance with one aspect of the invention, a method and apparatus for processing a primitive for potential display on a display device (having a plurality of pixels) determines if the primitive intersects at least a predetermined number of pixel fragments on the display device. The predetermined number is no less than one. The method and apparatus then cull the primitive as a function of whether the primitive intersects at least the predetermined number of pixel fragments. If it is culled, the primitive is not raster processed (i.e., not subjected to raster processing, whether or not complete).

In some embodiments, a graphics processor has 1) a raster stage capable of raster processing the primitive and 2) a geometry stage capable of forwarding primitive attribute data to the raster stage for raster processing. In such case, the apparatus and method may determine if the primitive intersects at least the predetermined number of pixel fragments on the display device before forwarding primitive attribute data from the geometry stage to the raster stage.

Those skilled in the art understand that a 2D image is generated from pixel fragments stored in a frame buffer.

Other embodiments do not cull the primitive if the primitive is determined to intersect at least the predetermined number of pixel fragments on the display device. Conversely, some embodiments cull the primitive if the primitive is determined to not intersect at least the predetermined number of pixel fragments on the display device.

A number of methods may be used to determine if the primitive intersects at least one pixel fragment on the display device. For example, a bounding box may be formed based upon positional data of the primitive. It then may be determined if the bounding box bounds more than a prespecified number of pixel fragments. If the bounding box does not bound more than the prespecified number of pixel fragments, then an equation defining the position of the primitive may be used to determine if the primitive intersects at least one pixel fragment. Moreover, the primitive may be culled if no pixel fragments are bounded by the bounding box.

In accordance with another aspect of the invention, an apparatus for processing a primitive for potential display on a display device having a plurality of pixels includes 1) a geometry stage capable of performing geometry operations on the primitive, and 2) a raster stage operatively coupled with the geometry stage. The geometry stage is capable of determining if the primitive intersects at least a predetermined number of pixel fragments on the display device. In addition, the geometry stage is configured to cull the primitive as a function of whether the primitive intersects at least the predetermined number of pixel fragments on the display device. The raster stage is capable of raster processing the primitive if the geometry stage does not cull the primitive.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

Illustrative embodiments avoid unnecessary processing by configuring the geometry stage of a graphics processor to prevent further processing of primitives that are too small to be rendered on a display device. To that end, the geometry stage first determines if a given primitive intersects at least a predetermined number of pixel fragments (e.g., one pixel fragment) on the display device. If it does (and the given primitive is not culled by other culling operations), then the geometry stage permits the given primitive to be further processed by succeeding graphics processor stages, such as the rasterization stage.

Conversely, if the geometry stage determines that the given primitive does not intersect the predetermined number of pixel fragments, then various embodiments stop processing the primitive. In that case, rather than continuing to process the given primitive, the geometry stage may begin processing the next succeeding primitive of the graphical object. Details of illustrative embodiments are discussed below.

Figure 1:
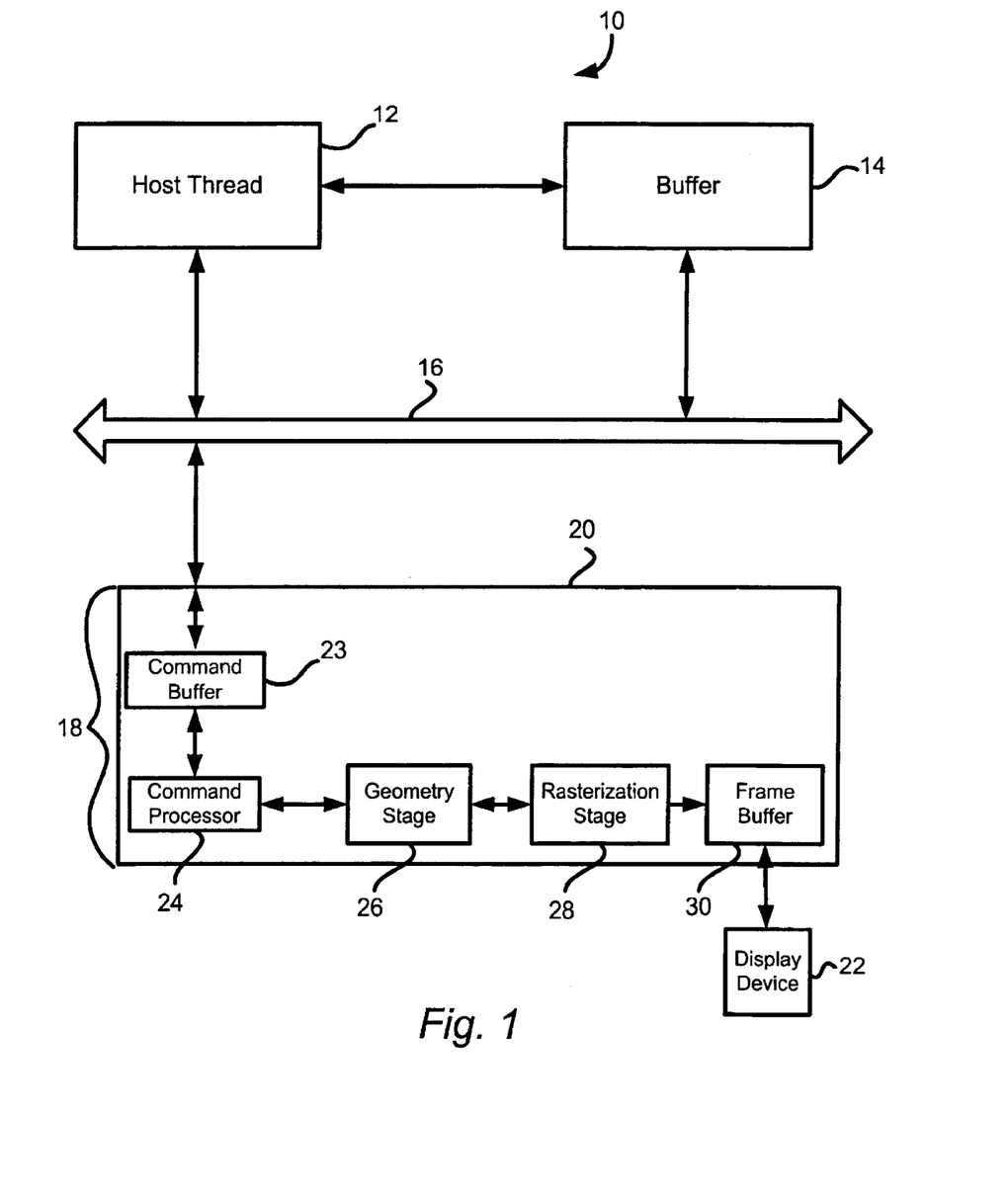
FIG. 1 schematically shows a portion of a computer system that may implement illustrative embodiments of the invention.

FIG. 1 schematically shows portions of a computer system 10 on which various embodiments of the invention may be implemented. In particular, the computer system 10 has a host thread 12 for generating vertex primitive data (e.g., attribute and positional data for any conventional graphics primitive type known in the art, such as triangles, lines, and points) for images to be displayed, and an optional buffer 14 for storing the primitive data generated by the host thread 12. In illustrative embodiments, the buffer 14 is formed in system memory within the general computer system 10. An interconnect apparatus, such as a PCI bus 16, provides a communication link between the various computer system components. In some embodiments, the buffer 14 is omitted and thus, the host thread 12 explicitly forwards vertex primitive data without buffering.

The computer system 10 also has 3D graphics subsystem 18 implementing the OPENGL standard, which was initially developed by Silicon Graphics, Inc. of Mountain View, Calif. It should be noted that discussion of such a computer system 10 and graphics subsystem 18 is exemplary and thus, is not intended to limit all embodiments of the invention. Accordingly, various embodiments of the invention can be applied to other graphics processing types and standards (e.g., DIRECT3D and 2D graphics subsystems).

As shown in FIG. 1, the graphics subsystem 18 has a number of components for producing and displaying 3D graphical objects. Specifically, the graphics subsystem 18 may include a graphics processor 20 for transforming and rasterizing the primitive data generated by the host thread 12 into a format that can be displayed on a display device 22. In simplified terms, the graphics processor 20, which may be implemented in either hardware or software, includes a series of stages for converting a mathematical representation of a 3D object into a corresponding 2D image that can be rendered on the display device 22. To those ends, the graphics processor 20 includes the following components:

1) a command buffer 23 (e.g., memory configured in a first-in, first-out manner) that buffers input commands from the host thread 12 (effectively acting as an input to the graphics processor 20) for load balancing purposes, 2) a command processor 24 acting as the graphics processor input for receiving and pre-processing graphics commands, 3) a geometry stage 26 for performing geometry operations (e.g., transformation and lighting processes) on primitive data produced by the host thread 12, 4) a rasterization stage 28 for rasterizing primitives transformed by the geometry stage 26, and 5) a frame buffer 30 for storing processed graphical images in screen space for display on the display device 22.

Those skilled in the art should understand that the descriptions following the noted components are generalizations of their function. Accordingly, in addition to the process discussed below with regard to FIG. 3, each of the noted graphics processor stages may perform other functions known in the art (e.g., texturing).

As noted above, the graphics processor 20 may be implemented in either hardware, software, or a combination of hardware and software. When implemented as software, each stage preferably is made up of a series of computer instructions that executes across one or more high speed parallel processors. When implemented as hardware, however, each stage illustratively may be a specially designed application specific integrated circuit that performs the required functions.

Figure 2:
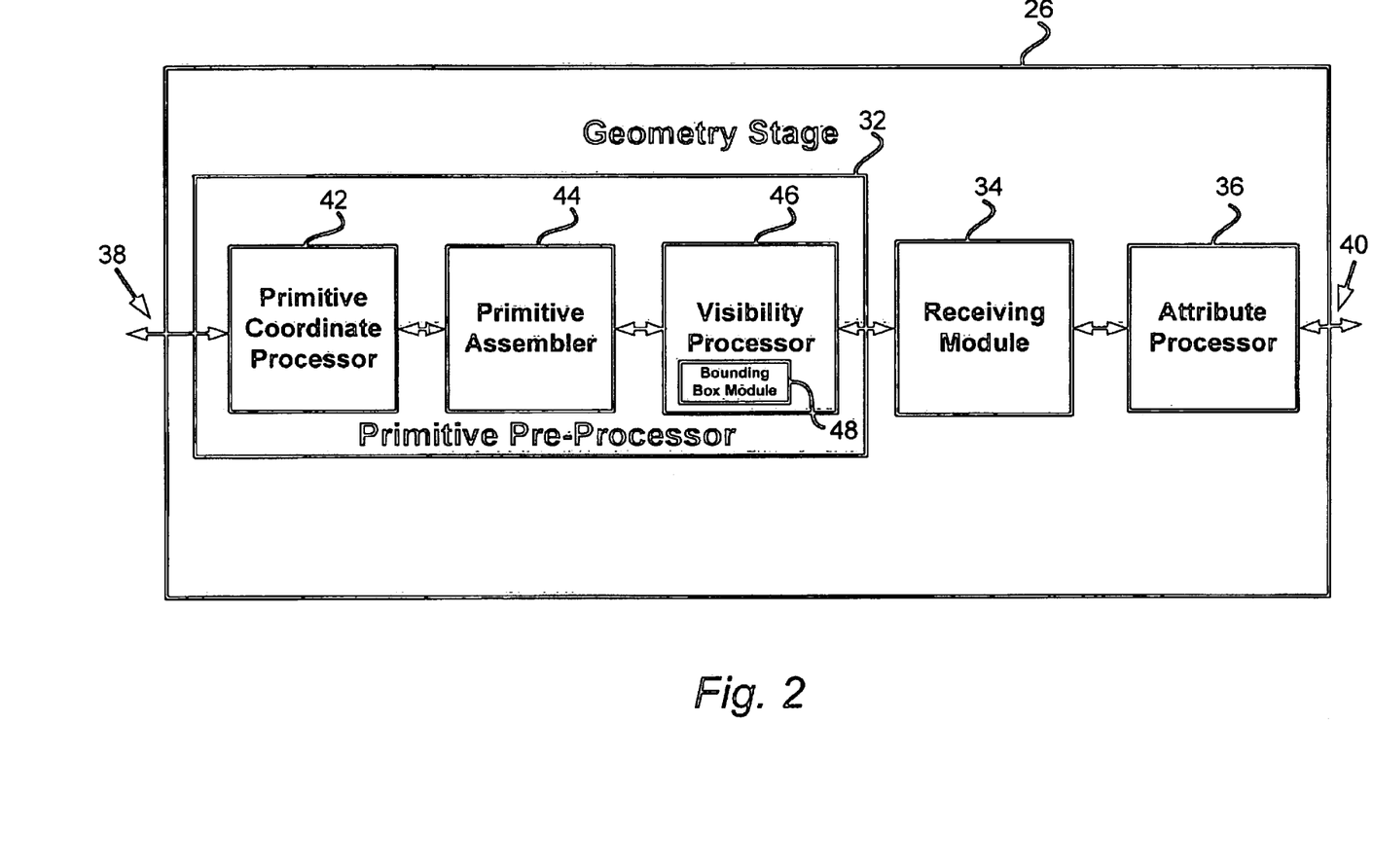
FIG. 2 schematically shows a geometry stage that may be configured to implement illustrative embodiments of the invention.

FIG. 2 schematically shows more details of the geometry stage 26 shown in FIG. 1. Among other things, the geometry stage 26 has a primitive pre-processor 32 for determining if a vertex will be visible in an image to be displayed on the display device 22, and a receiving module 34 for selectively causing primitive attribute data to be forwarded to/received by the graphics processor input. The geometry stage 26 also has an attribute processor 36 that performs general geometry stage processes (e.g., lighting and texture coordinate processing). A command interface 38 enables the geometry stage 26 to communicate with the command processor 24, while a raster interface 40 enables the geometry stage 26 to communicate with the rasterization stage 28.

FIG. 2 also shows more details of the primitive preprocessor 32. In particular, the primitive preprocessor 32 has a primitive coordinate processor 42 that transforms 3D coordinate data into screen space, a primitive assembler 44 for assembling primitives from their positional vertex data, and a visibility processor 46 for determining if assembled primitives will be visible in an image to be rendered. Moreover, to facilitate processing, the visibility processor 46 has a bounding box module 48 for logically forming bounding boxes about primitives to be rendered.

Figure 3:
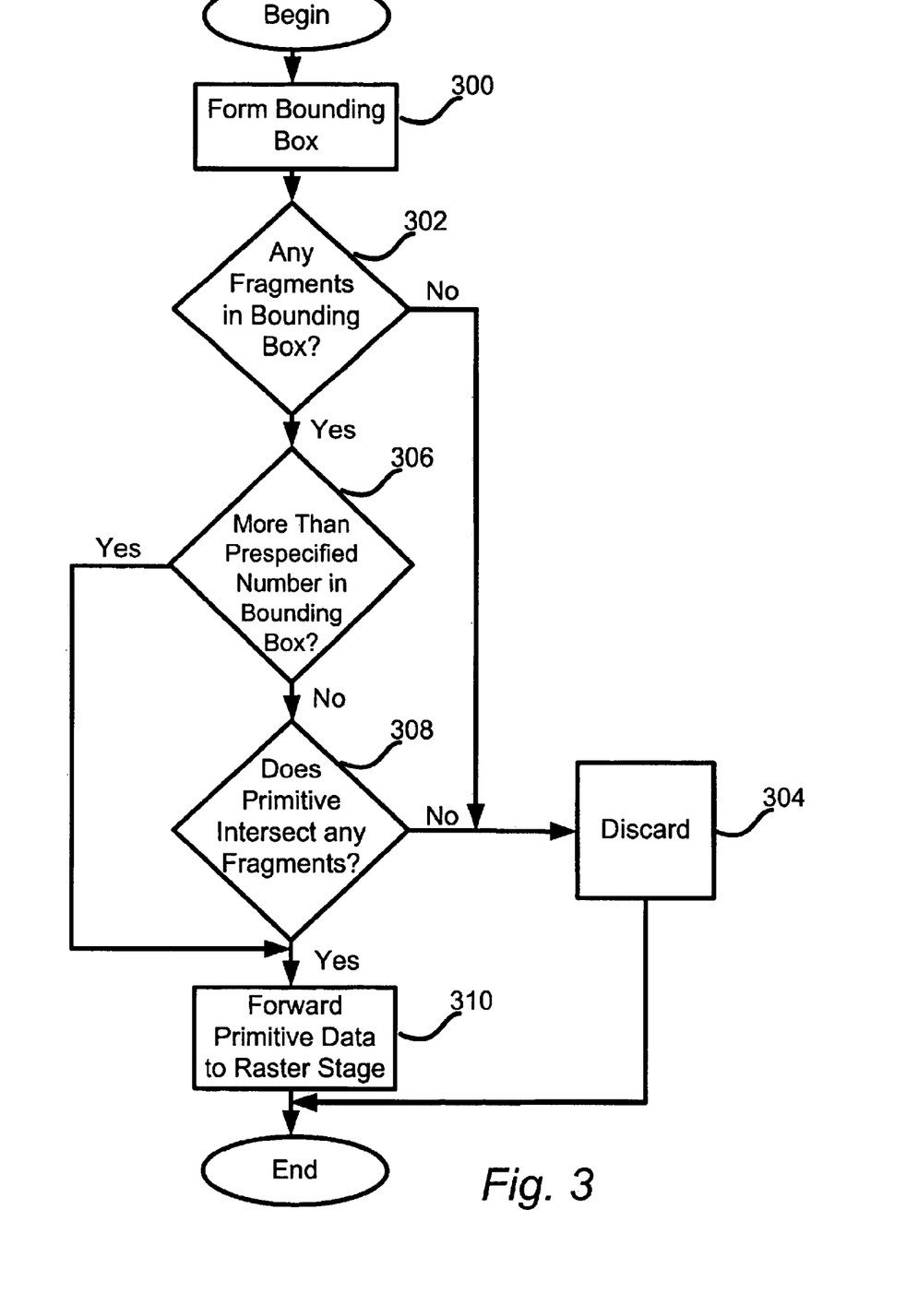
FIG. 3 shows a process used by the computer system shown in FIG. 1 for potentially culling a primitive in accordance with illustrative embodiments of the invention.

FIG. 3 shows a process used by the computer system 10 for potentially culling a primitive in accordance with illustrative embodiments of the invention. Generally, a primitive is considered to be culled if at any stage of the graphics processor pipeline, it is not forwarded to the next stage for further processing. For example, a given primitive is considered to be culled when the geometry stage 26 first determines that such primitive will not be visible and, consequently, begins processing another primitive. In that case, the geometry stage 26 does not forward data of the given primitive to the next stages.

Of course, as known in the art, a primitive also can be culled by means of other culling processes, such as back-face culling or occlusion culling processes. In illustrative embodiments, the system executes culling operations that are less computationally intensive (e.g., back-face culling) before executing the culling process discussed in FIG. 3. In a similar manner, such embodiments execute culling operations that are more computationally intensive (e.g., occlusion culling) after executing that culling process. It should be noted, however, that other embodiments are not limited to any specific order for performing culling operations.

The process of FIG. 3 begins at step 300, in which the bounding box module 48 forms a conventional bounding box about the primitive. Accordingly, as known by those in the art, the minimum and maximum X-coordinates of the primitive define the width of the bounding box. In a similar manner, the minimum and maximum Y-coordinates define the height of the bounding box. FIGS. 4A–4D schematically show exemplary bounding boxes for different triangle primitives.

Of course, before forming the bounding box, the primitive coordinate processor 42 and primitive assembler 44 cooperate to assemble the primitive in a conventional manner. Among other ways, the positional data (and subsequently, the attribute data, if necessary) may be explicitly forwarded from the host thread 12, or from the buffer 14 by pointer. For additional details relating to forwarding vertex data, see the above noted co-incorporated patent application naming Stephen Moffitt and Eng Lim Goh as co-inventors.

After receiving the positional data, the primitive coordinate processor 42 performs conventional transformation processes and forwards its resultant data to the primitive assembler 44. The primitive assembler 44 then uses that resultant data to logically assemble the primitive. Of course, because it merely is logically assembled, the primitive is not rasterized or rendered at this point. As known by those in the art, when assembling a primitive, the primitive assembler 44 determines which vertices make up the primitive. Among other things, assembly of the primitive at this point in the process permits the graphics processor 20 to use the positional data to determine if the primitive ultimately will be visible on the display device 22 (as discussed below).

The visibility processor 46 then determines if the bounding box intersects (i.e., bounds) any pixel fragments (step 302). In other words, the visibility processor 46 determines if any pixel fragments are within or on the boundary of the bounding box. It should be noted that the term "pixel fragment" has a well known meaning in the art. Specifically, a pixel fragment is a sample point logically located on a pixel. There can be one sample point or a plurality of sample points on a single pixel. For example, anti-aliasing processes (also known as "multisampling" processes) typically sample a pixel multiple times. Systems that do not multisample a pixel generally are considered to sample each pixel once (e.g., at the pixel center).

Accordingly, if it is determined at step 302 that the bounding box does not intersect any pixel fragments (e.g., see FIG. 4A), then the primitive can be trivially rejected. More specifically, if the bounding box intersects no pixel fragments, then the process continues to step 304, in which the attribute data is effectively discarded, thus ending the process.

Among other ways, the primitive preprocessor 32 may affirmatively discard the vertex attribute data by forwarding a message to the host thread 12 indicating that the attribute data for that vertex is not needed. In illustrative embodiments, however, the primitive pre-processor 32 effectively discards the vertex attribute data simply by not forwarding the discarded primitive to the rasterization stage 28. Instead, the primitive preprocessor 32 simply begins processing another primitive.

At this point in the process, it should be pointed out that as the number of pixel fragments in the bounding box increases, the likelihood that its corresponding primitive intersects at least one pixel fragment also increases. Accordingly, if there are more than a prespecified number of pixel fragments in a bounding box, then various embodiments skip further culling processes. The implementation dictates the predetermined number. For example, in one implementation, if more than ten pixel fragments are within the bounding box (e.g., see FIG. 4C), then there is a reasonably good chance that one of those pixel fragments is within the primitive. If so, then further cull processing as discussed in FIG. 3 can be suspended, thus saving processing steps.

Accordingly, returning to step 302, if the bounding box bounds at least one pixel fragment, then the process continues to step 306, in which it is determined if more than the prespecified number of pixel fragments intersect the bounding box. If the bound box intersects more than the prespecified number, then the process skips to step 310, in which the receiving module 34 retrieves the attribute data for processing by the attribute processor 36. After processing is complete, the geometry stage 26 forwards the resulting transformed data to the rasterization stage 28.

After receipt of the resulting transformed data from the geometry stage 26, the rasterization stage 28 performs conventional rasterization processes. For example, the rasterization stage 28 illustratively rasterizes the primitive and, when processing is completed, forwards data representing the fully processed primitive to the frame buffer 30. If double buffered, the frame buffer 30 could store the data of a fully processed image in its display portion of memory while receiving the pixel data (for the image currently being formed) in its write portion of memory.

Returning to step 306, if the visibility processor 46 determines that the bounding box does not intersect more than the predetermined number of pixel fragments, then the process continues to step 308. Specifically, at step 308, the visibility processor 46 determines if the primitive intersects any pixel fragments. To that end, the visibility processor 46 tests each pixel fragment within the bounding box to determine if any are within the mathematical border of the primitive (e.g., using edge equations).

If the primitive intersects at least one pixel fragment, then the process continues processing the primitive in a conventional pipelined manner (step 310, discussed above). Conversely, if the primitive does not intersect at least one pixel fragment, then the vertex data for that primitive is effectively discarded (step 304, discussed above).

For illustrative purposes, FIGS. 4A–4D schematically show pixel fragments and their spatial relationships with triangle primitives and their respective bounding boxes. Note that FIGS. 4A–4D are exemplary and not intended to limit the scope of the invention. Moreover, it should be noted that although triangle primitives are discussed, embodiments of the invention can be applied to other polygon primitives and line primitives. Discussion of triangle primitives thus is exemplary and not intended to limit the scope of the invention.

For simplicity, FIGS. 4A–4D each show one pixel only. No adjacent pixels are shown. Those skilled in the art should understand, however, that pixel fragments on adjacent pixels, if shown, could be used by various embodiments of the invention to determine if the primitive is to be culled. Accordingly, embodiments of the invention are not limited to pixel fragments in one pixel only. Pixel fragments from any pixel on the display device 22 should suffice to determine if a primitive is visible on an image to be displayed.

Figure 4A:
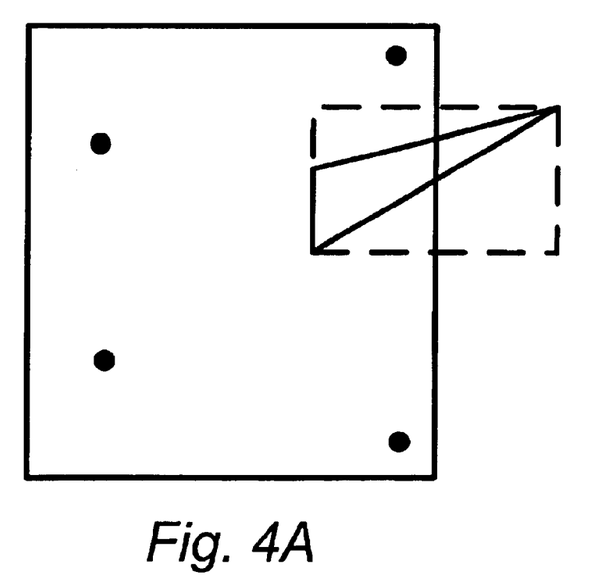
FIG. 4A schematically shows an exemplary primitive that intersects no pixel fragments and has an associated bounding box that also intersects no pixel fragments.
Figure 4B:
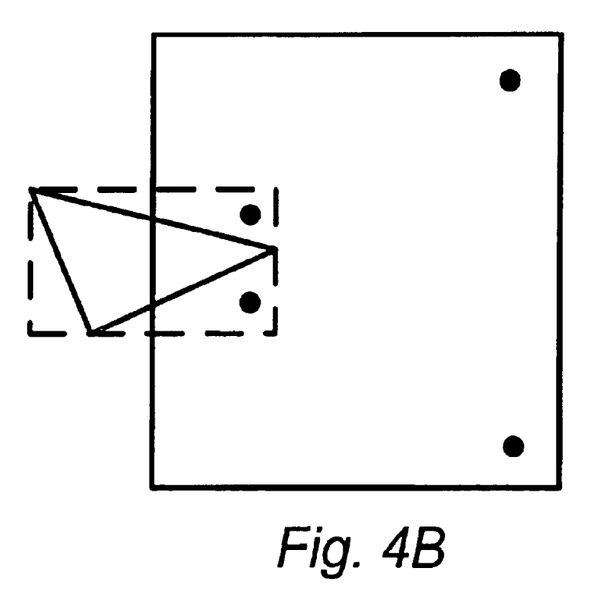
FIG. 4B schematically shows an exemplary primitive that intersects no pixel fragments, but has an associated bounding box that intersects two pixel fragments.
Figure 4C:
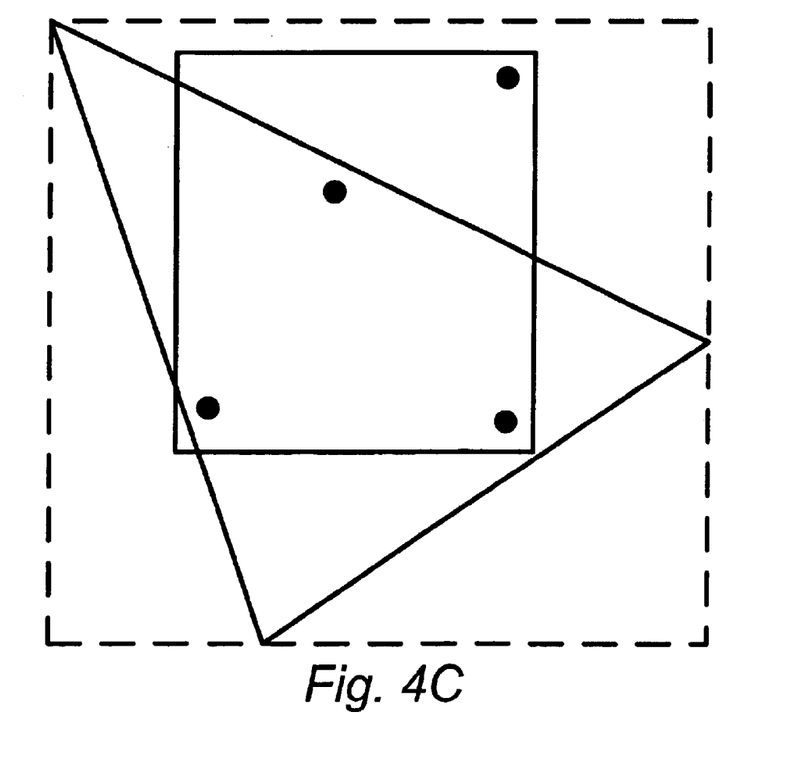
FIG. 4C schematically shows an exemplary primitive that intersects three pixel fragments and has a bounding box that intersects four pixel fragments.
Figure 4D:
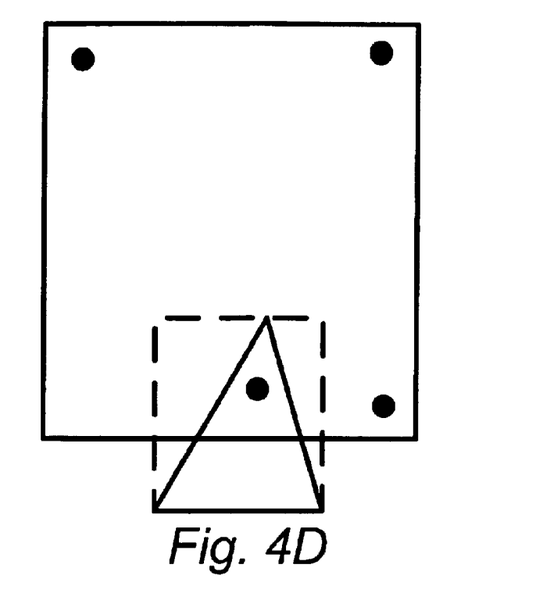
FIG. 4D schematically shows an exemplary primitive that intersects one pixel fragment and has an associated bounding box that also intersects that same pixel fragment.

FIG. 4A shows a primitive that intersects no pixel fragments and has an associated bounding box that also intersects no pixel fragments. FIG. 4B shows a primitive that intersects no pixel fragments. Its associated bounding box, however, intersects two pixel fragments. FIG. 4C shows a primitive that intersects three pixel fragments and has a bounding box that intersects four pixel fragments. FIG. 4D shows a primitive that intersects one pixel fragment and has an associated bounding box that also intersects that same pixel fragment only.

It should be noted that although various embodiments are discussed as culling primitives if they do not intersect at least one pixel fragment, alternative embodiments still may cull a primitive if it intersects one or more pixel fragments (e.g., two or three fragments). In a similar manner, the bounding box steps also may require a higher number of pixel fragments. Accordingly, discussion of specific numbers of pixel fragments within either a primitive or a bounding box is exemplary and not intended to limit all embodiments of the invention.

Accordingly, various embodiments of the invention cull a primitive as a function of whether it intersects at least one pixel fragment. In other words, if a primitive does not intersect at least one pixel fragment, it is culled. If it does, however, then it is processed in a conventional manner for display on the display device 22. The rasterization stage 28 thus should not process primitive data for a primitive that is too small to be rendered on the display device 22. Consequently, the disclosed graphics processor 20, including its rasterization stage 28, should receive and process small graphics primitives in a more rapid and efficient manner than those within systems that do not implement the disclosed processes.

In alternative embodiments, rather than being within the geometry stage 26, the disclosed functionality may be performed by another module. For example, the disclosed functionality may be a preprocessing stage within the raster stage 28. Accordingly, in that case, the raster stage 28 preprocesses the primitive data in the specified manner before applying conventional rasterization processes. As a second example, the disclosed functionality may be within some other system component between the geometry stage 26 and the raster stage 28.

Some embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and method may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques).

The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other things, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of processing a primitive for potential display on a display device having a plurality of pixels, the method comprising:

determining if the primitive intersects at least a predetermined number of pixel fragments on the display device, the predetermined number being no less than one; and culling the primitive as a function of whether the primitive intersects at least the predetermined number of pixel fragments on the display device, the primitive not being raster processed if culled.

2. The method as defined by claim 1 wherein a graphics processor has a raster stage capable of raster processing the primitive, the graphics processor also having a geometry stage capable of forwarding primitive attribute data to the raster stage for raster processing, determining comprising determining if the primitive intersects at least the predetermined number of pixel fragments on the display device before forwarding primitive attribute data from the geometry stage to the raster stage.

3. The method as defined by claim 1 wherein a graphics processor has a raster stage capable of raster processing the primitive, the graphics processor also having a geometry stage capable of forwarding primitive attribute data to the raster stage for raster processing, determining comprising the raster stage determining if the primitive intersects at least the predetermined number of pixel fragments on the display device.

4. The method as defined by claim 1 wherein the primitive is not culled if the primitive is determined to intersect at least the predetermined number of pixel fragments on the display device.

5. The method as defined by claim 1 wherein the primitive is culled if the primitive is determined to not intersect at least the predetermined number of pixel fragments on the display device.

6. The method as defined by claim 1 wherein determining comprises:

forming a bounding box based upon positional data of the primitive.

7. The method as defined by claim 6 further wherein the primitive has an associated equation defining its position on the display device, the method further comprising:

determining if the bounding box bounds more than a prespecified number of pixel fragments; and if the bounding box does not bound more than the prespecified number of pixel fragments, then using the equation to determine if the primitive intersects at least the predetermined number of pixel fragments.

8. The method as defined by claim 6 wherein the primitive is culled if the bounding box bounds no pixel fragments.

9. An apparatus for processing a primitive for potential display on a display device having a plurality of pixels, the apparatus comprising:

a geometry stage capable performing geometry operations on the primitive, the geometry stage also being capable of determining if the primitive intersects at least a predetermined number of pixel fragments on the display device, the geometry stage being configured to cull the primitive as a function of whether the primitive intersects at least the predetermined number of pixel fragments on the display device, the predetermined number being no less than one; and a raster stage operatively coupled with the geometry stage, the raster stage being capable of raster processing the primitive if the geometry stage does not cull the primitive.

10. The apparatus as defined by claim 9 wherein the primitive has associated attribute data, the geometry stage having an output for forwarding the attribute data to the raster stage if the primitive intersects at least the predetermined number of pixel fragments on the display device.

11. The apparatus as defined by claim 9 wherein the primitive has associated attribute data, further wherein the geometry stage is configured to not forward the attribute data to the raster stage if the primitive is determined to not intersect at least the predetermined number of pixel fragments on the display device.

12. The apparatus as defined by claim 9 wherein the geometry stage comprises:

a bounding box module capable of forming a bounding box based upon positional data of the primitive.

13. The apparatus as defined by claim 12 further wherein the primitive has an associated equation defining its position on the display device, the geometry stage using the equation to determine whether the primitive intersects at least one pixel fragment if the bounding box bounds fewer than a prespecified number of pixel fragments.

14. The apparatus as defined by claim 12 wherein the primitive has associated attribute data, further wherein the geometry stage does not forward the attribute data to the raster stage if no pixel fragments are bounded by the bounding box.

15. A computer program product for use on a computer system for processing a primitive for potential display on a display device having a plurality of pixels, the computer program product comprising a computer usable medium having computer readable program code thereon, the computer readable program code comprising:

program code for determining if the primitive intersects at least a predetermined number of pixel fragments on the display device, the predetermined number being no less than one; and program code for culling the primitive as a function of whether the primitive intersects at least the predetermined number of pixel fragments on the display device, the primitive not being raster processed if culled.

16. The computer program product as defined by claim 15 wherein the primitive is not culled if the primitive is determined to intersect at least the predetermined number of pixel fragments on the display device.

17. The computer program product as defined by claim 15 wherein the primitive is culled if the primitive is determined to not intersect at least the predetermined number of pixel fragments on the display device.

18. The computer program product as defined by claim 15 wherein the program code for determining comprises:

program code for forming a bounding box based upon positional data of the primitive.

19. The computer program product as defined by claim 18 further wherein the primitive has an associated equation defining its position on the display device, the computer program product further comprising:

program code for determining if the bounding box bounds more than a prespecified number of pixel fragments; and program code for using the equation to determine whether the primitive intersects at least the predetermined number of pixel fragments, the program code for using being executed if the bounding box does not bound more than the prespecified number of pixel fragments.

20. The computer program product as defined by claim 18 wherein the primitive is culled if no pixel fragments are bounded by the bounding box.

* * * * *